(No Model.)

T. J. SMITH.
TRACE FASTENER.

No. 486,571. Patented Nov. 22, 1892.

WITNESSES:
Chas. H. Luther Jr.
Henry J. Miller

INVENTOR:
Thomas J. Smith
by Joseph A. Miller & Co.
Attys.

UNITED STATES PATENT OFFICE.

THOMAS J. SMITH, OF PROVIDENCE, RHODE ISLAND.

TRACE-FASTENER.

SPECIFICATION forming part of Letters Patent No. 486,571, dated November 22, 1892.

Application filed April 21, 1892. Serial No. 430,083. (No model.)

*To all whom it may concern:*

Be it known that I, THOMAS J. SMITH, of the city of Providence, in the county of Providence and State of Rhode Island, have invented certain new and useful Improvements in Trace-Fasteners; and I hereby declare that the following is a full, clear, and exact description of the same, reference being had to the accompanying drawings, forming part of this specification.

This invention has reference to improvements in devices by which traces may be held in place on the ends of whiffletrees or on studs with which the ends of said whiffletrees are provided.

The object of the invention is to provide a fastening device for the ends of whiffletrees, over which the trace may be readily slipped, but which will prevent the removal of the trace until the same is turned to bring the fastening device in a line with the slot cut in the end of the trace.

The invention consists in certain peculiar features of construction and novel combination of parts, which will hereinafter be more fully described, and pointed out in the claims.

Figure 1:
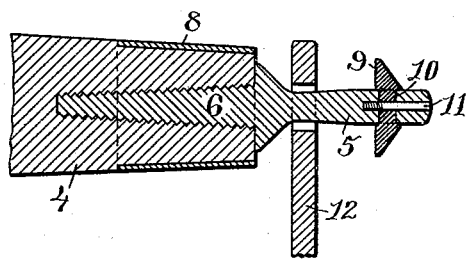
Figure 2:
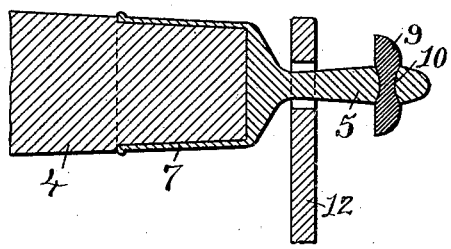

Figure 1 represents a longitudinal view of a whiffletree provided with a stud screwed into the end of the same and showing the trace-fastener inserted in a transverse slot in the outer end of the stud and secured in place by a pin. Fig. 2 represents a similar view of a whiffletree provided with a stud having a socket which is secured over the end of the whiffletree, the fastening device having concaved portions which are grasped between the convex sides of the transverse slot.

Similar numbers of reference designate corresponding parts throughout.

In the drawings, 4 indicates the end portion of a whiffletree, and 5 a stud extending therefrom. This stud may be provided with a screw-shank 6, which is screwed into the end of the whiffletree, or the base of the stud may be extended to form a socket 7, into which the end of the whiffletree may be inserted and secured by any usual means. When the screw-shank 6 is used, I prefer to surround the end of the whiffletree with a collar 8 to prevent the end of the same from splitting when the shank is screwed in. The stud may, however, be formed in part with the whiffletree.

In the outer end of the stud 5 I form a transverse slot having straight sides, as shown in Fig. 1, or provided with convex sides, as indicated in Fig. 2, and in this slot I secure a bar 9, of some elastic or resilient material. This bar has a contracted neck 10. The surface of the bar 9 opposite the whiffletree extends practically at right angles with the line of the stud 5, while the outer surface tapers from each end toward the central portion at a considerable outward angle, and this tapering portion may be curved, if desired. I sometimes screw the pin 11 into the end of the stud 5 and through the contracted neck of the bar 9 to more securely fasten the same in place. This, however, is not necessary.

By contracting the central portion of the bar 9 I form bearing-shoulders to bear against the edges of the slot in the stud and have a tendency to resist any outward strain on the ends of the bar, the trace 12 being thus securely held on the stud until turned to bring the slot in the end thereof in a line with the bar 9. A slight inward pressure on the thin ends of the bar 9 will, however, bend them toward the whiffletree and the trace can be slipped over them.

Having thus described my invention, I claim as new and desire to secure by Letters Patent—

1. In a trace-fastening, the combination, with a whiffletree and a stud extending from the end thereof and provided with a transverse slot, of an elastic bar having a contracted central portion and tapering ends secured in said slot, as described.

2. The combination, with the whiffletree 4 and the stud 5, secured thereto and having a transverse slot, of the elastic bar 9, having the contracted neck 10 secured in said transverse slot, as described.

In witness whereof I have hereunto set my hand.

THOMAS J. SMITH.

Witnesses:
HENRY J. MILLER,
JOSEPH A. MILLER, Jr.